United States Patent
Buehlman et al.

(10) Patent No.: US 6,210,073 B1
(45) Date of Patent: Apr. 3, 2001

(54) MULTI-LEVEL FLUID TRANSFER APPARATUS, SYSTEM AND PROCESS

(75) Inventors: Mark D. Buehlman, Aurora, IL (US); Frederick C. Payne, Charlotte; Daniel T. Rogers, Milford, both of MI (US)

(73) Assignee: AMSTED Industries Incorporated, Chicago, IL (US)

( * ) Notice: Subject to any disclaimer, the term of this patent is extended or adjusted under 35 U.S.C. 154(b) by 0 days.

(21) Appl. No.: 09/201,548

(22) Filed: Nov. 30, 1998

(51) Int. Cl.[7] ................................ B09C 1/00; B09C 1/10
(52) U.S. Cl. ......................... 405/128; 166/52; 166/269; 210/170; 210/747
(58) Field of Search ........................... 405/128; 166/266, 166/267, 268, 271, 369, 370, 269, 52; 210/170, 747; 588/205

(56) References Cited

U.S. PATENT DOCUMENTS

| | | | |
|---|---|---|---|
| 4,730,672 | 3/1988 | Payne | 166/266 |
| 4,890,673 | 1/1990 | Payne | 166/266 |
| 4,919,570 | 4/1990 | Payne | 405/128 |
| 4,945,988 | 8/1990 | Payne et al. | 166/266 |
| 5,050,677 | 9/1991 | Payne | 166/278 |
| 5,221,159 | 6/1993 | Billings et al. | 405/128 |
| 5,279,740 | 1/1994 | Basile et al. | 210/610 |
| 5,310,282 | * 5/1994 | Voskamp | 405/128 X |
| 5,341,877 | * 8/1994 | Abdul et al. | 166/370 X |
| 5,342,147 | 8/1994 | Payne et al. | 405/128 |
| 5,360,067 | * 11/1994 | Meo, III | 405/128 X |
| 5,402,848 | 4/1995 | Kelly | 166/266 |

(List continued on next page.)

FOREIGN PATENT DOCUMENTS

0548765 A2 * 6/1993 (EP) ..................... 405/128

OTHER PUBLICATIONS de Percin, Paul, Vacuum Extraction/Air Sparging With Bioremediation for Organics, Tech Trends, Nov. 1994.*
Pollution Engineering; Jul. 1, 1992; entitled "Air Sparging: A New Model for Remediation" by Richard A. Brown, Ph.D., and Frank Jasiulewicz, PG; pp. 52–55.
Industrial Wastewater; Jul./Aug. 1997; entitled "Innovative Air Sparging Techniques" by Steven P. Sittler and Michael A. Hansen; pp. 27–32.

Primary Examiner—Eileen D. Lillis
Assistant Examiner—Tara L. Mayo
(74) Attorney, Agent, or Firm—Edward J. Brosius; Stephen J. Manich

(57) ABSTRACT

A multi-level fluid transfer system, apparatus and process. In one well bore hole, there are multiple fluid transfer devices positioned to inject a fluid, such as air, at multiple levels in the well bore hole. There are seals between the levels establishing multiple compartments. Each fluid transfer device has an outlet in one of the compartments. The fluid transfer devices are connected to receive the fluid, which is transmitted into the well bore hole and released within the multiple compartments of the well bore hole. The fluid travels out of the well bore hole compartments in separate streams at different levels or depths and out into the contaminated ground. The multiple levels in the injection well allow for release of the fluid both above and below any lenses or areas of low permeability in the ground, to improve the efficacy of the remediation process. The multiple fluid transfer devices may be assembled into an apparatus with concentric riser conduits. The apparatus, system and method may be used for injecting a biological agent, for injection of an oxidant, and for injection of a sparging gas such as air. Different fluids may also be introduced at different levels, such as a gas and a liquid, to promote mixing of the liquid agent in the ground. The same apparatus may also be used as an extraction well by connecting the apparatus to a vacuum source for vapor extraction or use as part of a sparging system. The injection wells may also be used with traditional extraction wells in a sparging system.

23 Claims, 4 Drawing Sheets

U.S. PATENT DOCUMENTS

| | | | |
|---|---|---|---|
| 5,588,490 | 12/1996 | Suthersan et al. | 166/370 |
| 5,655,852 | 8/1997 | Duffney et al. | 405/258 |
| 5,676,207 | 10/1997 | Simon et al. | 166/268 |
| 5,697,437 | * 12/1997 | Weidner et al. | 166/52 |
| 5,879,108 | * 3/1999 | Haddad | 405/128 |
| 5,888,022 | * 3/1999 | Green | 588/205 X |
| 5,967,230 | * 10/1999 | Cooper et al. | 166/52 X |
| 6,092,599 | * 7/2000 | Berry et al. | 166/369 X |

* cited by examiner

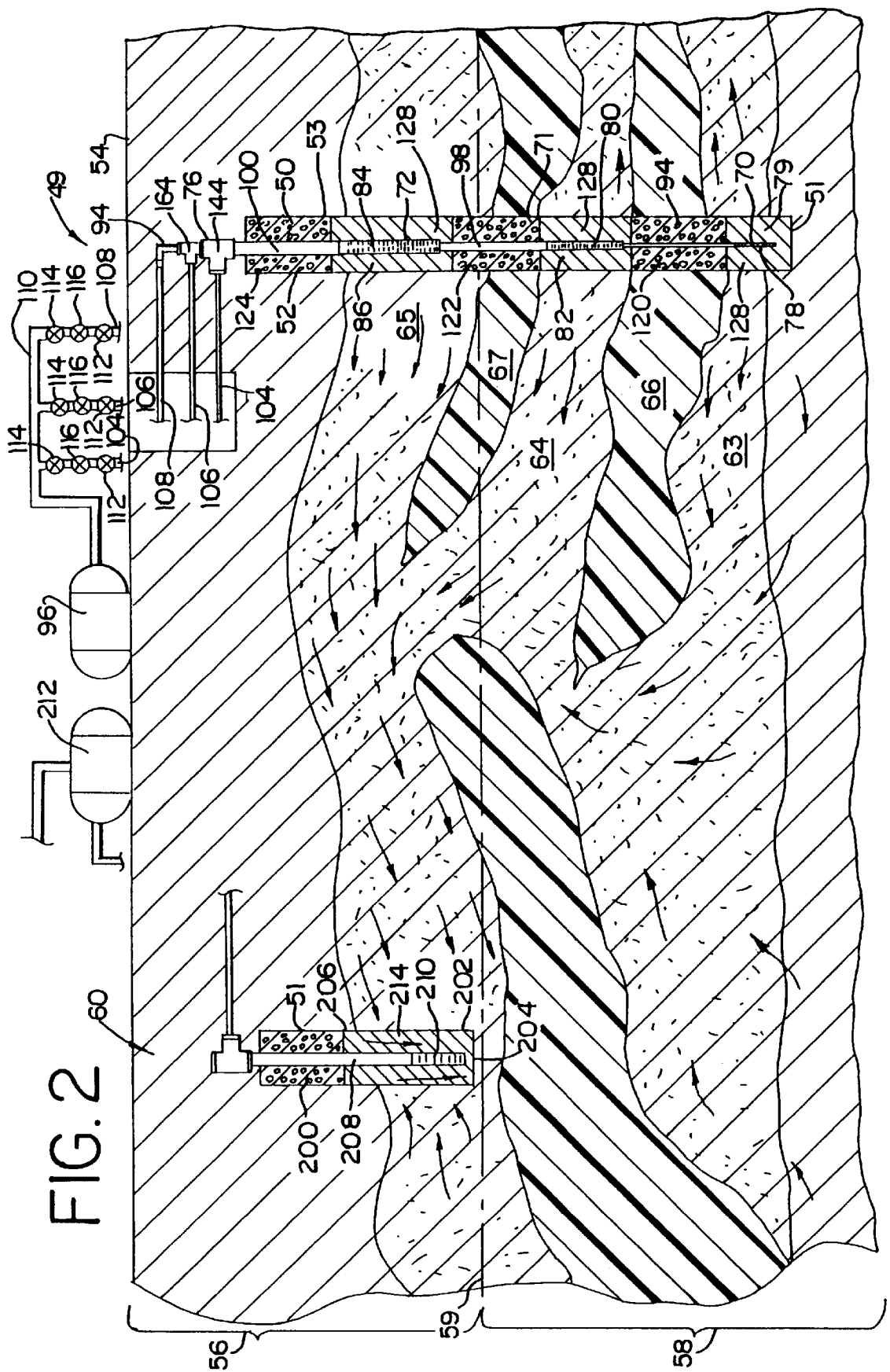

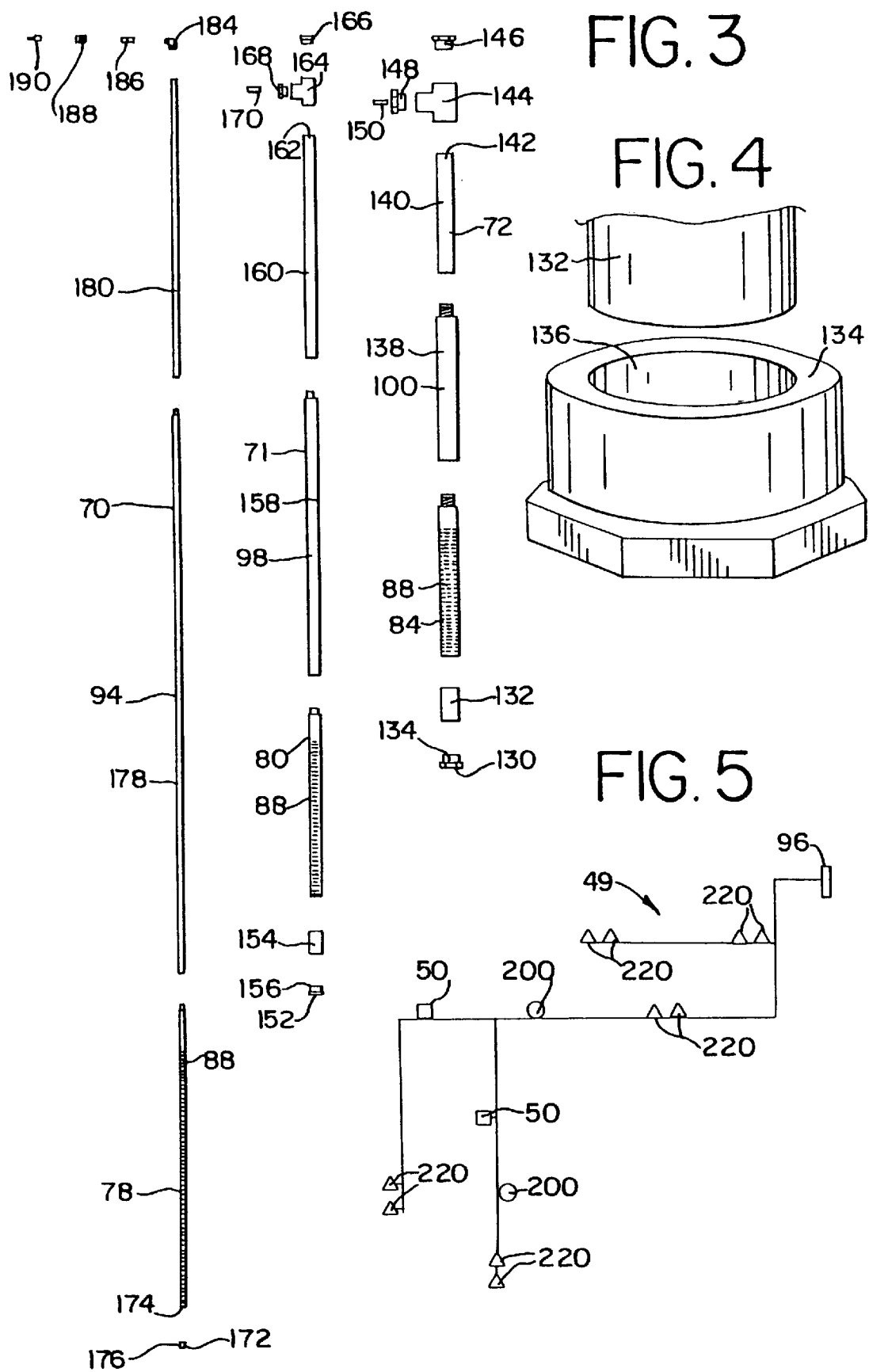

MULTI-LEVEL FLUID TRANSFER APPARATUS, SYSTEM AND PROCESS

BACKGROUND OF THE INVENTION

1. Field of the Invention.

The present invention relates to remediation methods that depend on the injection or extraction of fluids to or from porous media.

2. Description of the Art.

Subsurface soil and groundwater in an aquifer may be contaminated by a variety of organic or inorganic chemical compounds. Various remedial methods have been used to reduce or destroy these contaminants in place. Four of those remedial methods were: 1) Soil Vapor Extraction; 2) Aquifer Sparging; 3) Biodegradation; and 4) Direct Oxidation (that is, oxidant injection). Each of these four remedial methods depends on the injection or extraction of fluids to or from porous media.

Generally, in these prior systems, one or more injection wells have been constructed on the site to be remediated. Each injection well has had one injection point, usually consisting of a slotted well screen placed below the base of the contaminant plume in the soil. For sparging and soil vapor extraction, one or more extraction wells have been constructed on the site. Such prior systems have generally been effective in injecting desired liquid or gaseous fluids into contaminated areas in soils that comprise homogeneous, coarse-grained geologic formations.

However, as reported by Steven P. Sittler and Michael A. Hansen in "Innovative Air Sparging Techniques," Industrial Wastewater, July/August 1997 at page 20, experts estimate that fewer than 25% of remediation sites nationwide are conducive to conventional air sparging because many sites have varying geologic and hydrogeologic conditions. For example, the site could have a one or more lenses of low permeability material such as silt or clay within the phreatic zone; there could also be other geologic formations of low-conductivity. With the vertical sparge or injection point below the lens, the sparge air bubbles could travel around the lens, missing any contaminant above the lens, for example, and leaving potentially significant pockets of dissolved contaminant in the groundwater. Similar problems would be expected with the other remedial methods that depend on the injection or extraction of fluids to or from porous media, wherein the non-homogeneous porous media may block the path of a pocket of vapor to be extracted, or the path of the biodegradation material or oxidant to all of the affected areas of soil.

Various techniques have been attempted to solve the problems presented by non-homogeneous site conditions. Extensive and expensive sampling of the soil has been performed in an attempt to fully and accurately define the geologic formations. Once the geologic formations have been defined, multiple wells have been installed in different bore holes at what was interpreted to be the proper elevations. With separate well bores at separate depths, fluids could then be transferred at different levels. The expense of this technique has limited its utility. For sparging, another prior technique involved flow-through trench sparging in low permeability geologic formations. The need for horizontal trenching and the potential to generate large quantities of contaminated soil, however, has reduced the economic benefits of this technique.

BRIEF SUMMARY OF THE INVENTION

The present invention provides a system, apparatus and process for transferring fluid into and out of contaminated porous media at multiple depths.

BRIEF DESCRIPTION OF THE DRAWINGS

In the figures of the Drawings, like reference numerals identify like components and:

FIG. 2 is a cross-section of a contaminated aquifer, showing one embodiment of the apparatus of the present invention for injecting a fluid into the aquifer, along with an extraction well;

FIG. 3 is an exploded view of the embodiment of the apparatus of the present invention shown in FIG. 2;

FIG. 4 is an enlarged perspective view of one of the end caps of the apparatus of FIG. 3;

FIG. 5 is a schematic showing one example of a possible layout for a sparging system employing the principles of the present invention.

DETAILED DESCRIPTION

Figure 1:
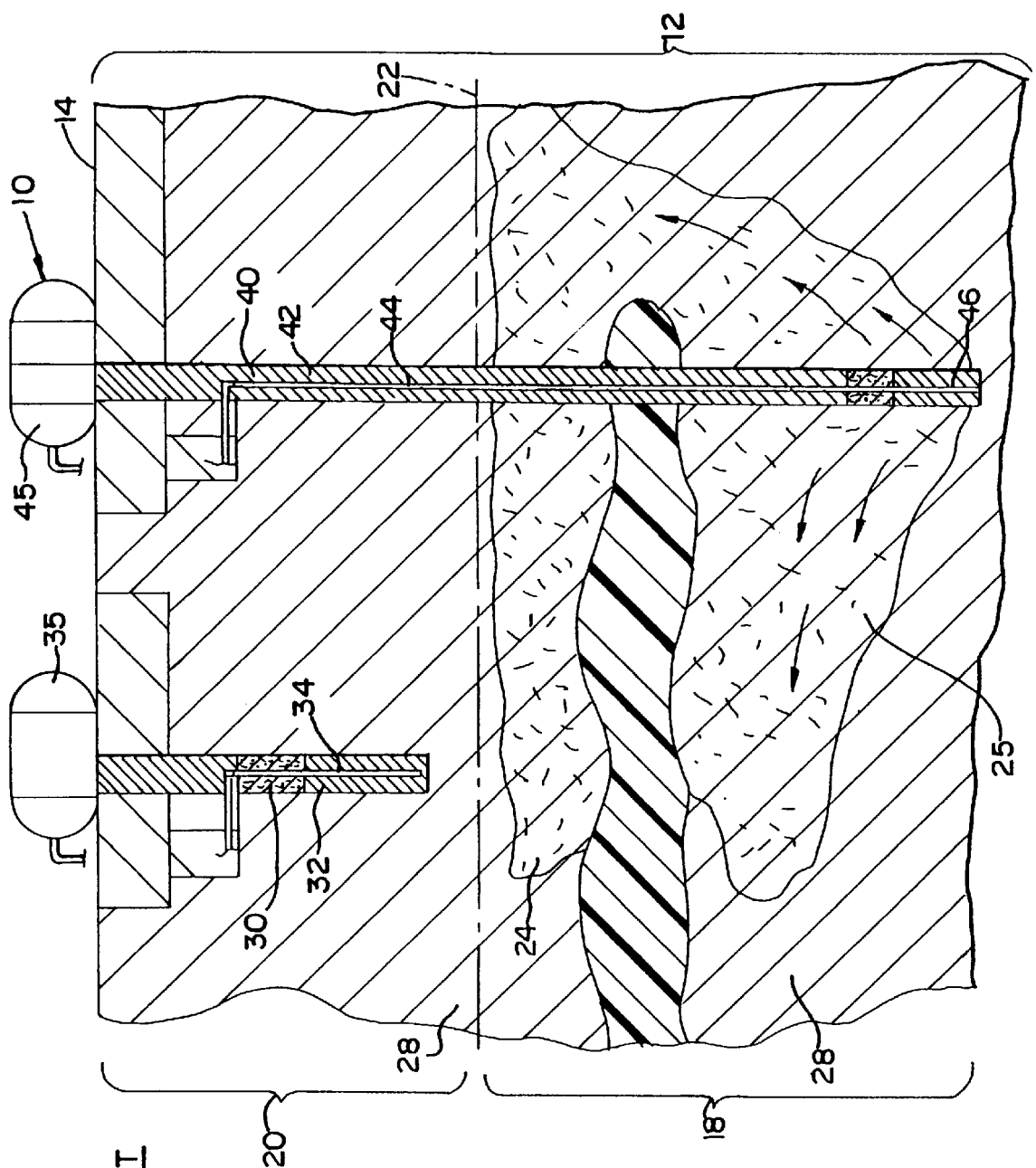
FIG. 1 is a cross-section of a contaminated aquifer, showing a prior art fluid injection and extraction system.

A prior art system 10 for remediating contamination is shown in FIG. 1 in place in a contaminated ground 12. The contaminated ground 12 has a surface ground level 14, a zone or level of fluid-saturated porous media 18, and a vadose or unsaturated zone 20 above the saturated zone 18 in which pore spaces are filled with fluid, typically at less than atmospheric pressure. The water table 22 is at the boundary between the saturated zone 18 and the vadose or unsaturated zone 20. As shown in FIG. 1, the contaminated ground may have one or more plumes 24, 25 of relatively concentrated contaminant in the saturated zone, with other areas of the groundwater having lower concentrations of that contaminant, for example. Such a plume may be in the area nearest the source of the contaminant. There may also be lenses 26 in the saturated zone 18. Such lenses 26 may comprise areas of silt or clay with low permeability and low conductivity, surrounded by areas 28 of coarser material having greater conductivity.

The illustrated prior art remediation system 10 includes both an injection well 40 and an extraction well 30, although it should be understood that different prior art remediation methods and systems that depend on the injection or extraction of fluids have used either injection wells, extraction wells or both. Although one extraction well is shown, such prior art systems typically included a plurality of spaced extraction wells. The extraction well 30 may be of the type described in U.S. Pat. No. 5,050,677 (1991), which is incorporated by reference herein in its entirety. As shown in FIG. 1, a typical extraction well comprises a well bore hole 32 that extends into the unsaturated zone 20 but above the saturated zone 18. The exact depth and position of such a bore hole 32 is determined according to site conditions and site stratigraphy using principles commonly known to those skilled in the art. A conduit 34 extends from above the surface ground level 14 into the well bore hole 32. The open bottom end of the conduit is disposed within the well bore hole and the upper end is connected to a pump 35. In air-sparging methods, the pump has been operated to draw air and volatized contaminants into the well bore 32, and up and out of the conduit 34. Such extraction systems have also been used in vapor extraction methods and systems to draw vapor from the unsaturated zone into the well bore 32 and up and out of the conduit 34.

The prior art system of FIG. 1 illustrates a typical injection well used to inject a fluid into the contaminated ground. For sparging, the fluid injected has been a gas, typically air.

For use in biodegradation, the fluid injected typically contains microbes in a suitable liquid carrier that may contain nutrients for the microbes. For direct oxidation, the fluid injected has comprised a liquid or gaseous oxidant, such as ozone, Fenton's Reagent or potassium permanganate. As used throughout this description and claims, the term "fluid" is intended to include both gases and liquids.

In a prior art system 10 such as that shown in FIG. 1, multiple injection wells 40 have been employed, and the injection wells have been spaced apart and placed according to site conditions and site stratigraphy using principles commonly known to those skilled in the art.

As shown in FIG. 1, each injection well 40 typically comprises a well bore hole 42 that extends through the unsaturated zone 20, and typically, the bore holes 42 have terminated below the water table 22 in the saturated zone 18, although in some prior art methods the injection well bore holes have terminated above the water table 22 in the unsaturated zone 20.

The exact depth and position of such a bore hole 42 has been determined according to site conditions and site stratigraphy using principles commonly known to those skilled in the art. A conduit 44 extends from above the surface ground level 14, where it is connected to a fluid source 45, into the well bore hole 42 to an injection point or zone 46 below the base of the contaminant plume 25. Various structures have been used at the injection points or zones 46 as fluid outlets, such as slotted screens for air sparging systems. The position of the injection point or zone in each individual injection well has been determined through detailed sampling of the site to attempt to accurately define the geologic formation, with multiple well bore holes drilled to what were interpreted as the proper elevations or depths.

However, in some geologic formations, the injection may be inadequate. Zones of relatively impermeable material may block the flow of the injected fluid so that some regions of the contaminant plume are not effectively remediated. An example of such a formation is illustrated in FIG. 1, where the fluid flows, shown by the arrows, from the injection well 40 flow through the contaminant plume 25 but are substantially blocked from contaminant plume 24 by the less permeable formation 26.

As shown in FIG. 2, the present invention provides a multi-level fluid transfer system 49 for remediating a subsurface area of ground having a contaminated area, and is particularly useful in remediating subsurface contaminated areas separated by less permeable areas. The present invention may be useful for transferring fluid in remedial methods and systems that depend on the injection or extraction of fluids to or from porous media, such as soil vapor extraction, aquifer sparging, biodegradation and direct oxidation processes, for example. Thus, the fluid transferred may include both liquids and gases, and the fluid may contain solid materials as well, such as microbes. The illustrated multi-level fluid transfer system includes at least one fluid transfer well 50. The illustrated embodiment comprises an air sparging system, and includes at least one extraction well 51, although it should be understood that it is not necessary to include an extraction well in all uses of the present invention It should also be understood that it may be desirable to use a single well alternately as both an injection well and an extraction well by reversing the flow of fluid. The expression "fluid transfer" in this description and in the claims is intended to include both injection and extraction of fluid. It should also be understood that a typical system would use a plurality of wells.

In the illustrated embodiment, each fluid transfer well 50 has a single well bore hole 52 that extends vertically down from the ground level 54, through the unsaturated or vadose zone 56, and into the saturated zone 58 of the ground 60. The exact depth of the well bore hole 52 is determined according to the site conditions and site stratigraphy, using principles commonly known to those skilled in the art. Although the well bore hole 52 of the illustrated embodiment extends deep below the water table 59 into the saturated zone, the well bore hole 52 should at a minimum extend below the base of the contaminated area of ground 62. Depending on the site conditions, typical fluid transfer wells could have depths of less than 100 feet to depths of more than 300 feet, for example.

It should be understood that as used herein "ground" is intended to refer to the soil or other porous media and the groundwater contained therein, as well as any air or other gas or other liquid contained in the porous media or soil. Moreover, "ground" and "soil" are intended to refer to all geologic and hydrogeologic conditions, including, for example, silt, clay, sand or rocky conditions, and combinations of such conditions. Thus, "ground" includes both saturated and unsaturated porous media of any permeability and porosity, whether or not homogeneous, and regardless of the constituents of the porous media.

The contaminated area 62 of ground 60 may include more than one zone of contaminant. As shown in FIG. 2, in the illustrated example there is a first level or zone of icontaminated ground 63 and a second level or zone of contaminated ground 64. A less permeable level or zone 66 of the subsurface ground, such as a lens of a low-conductivity silt or clay material in the geologic formation, may extend between the first contaminated level or zone 63 and second contaminated level or zone 64 to partially or completely separate them.

Figure 6:
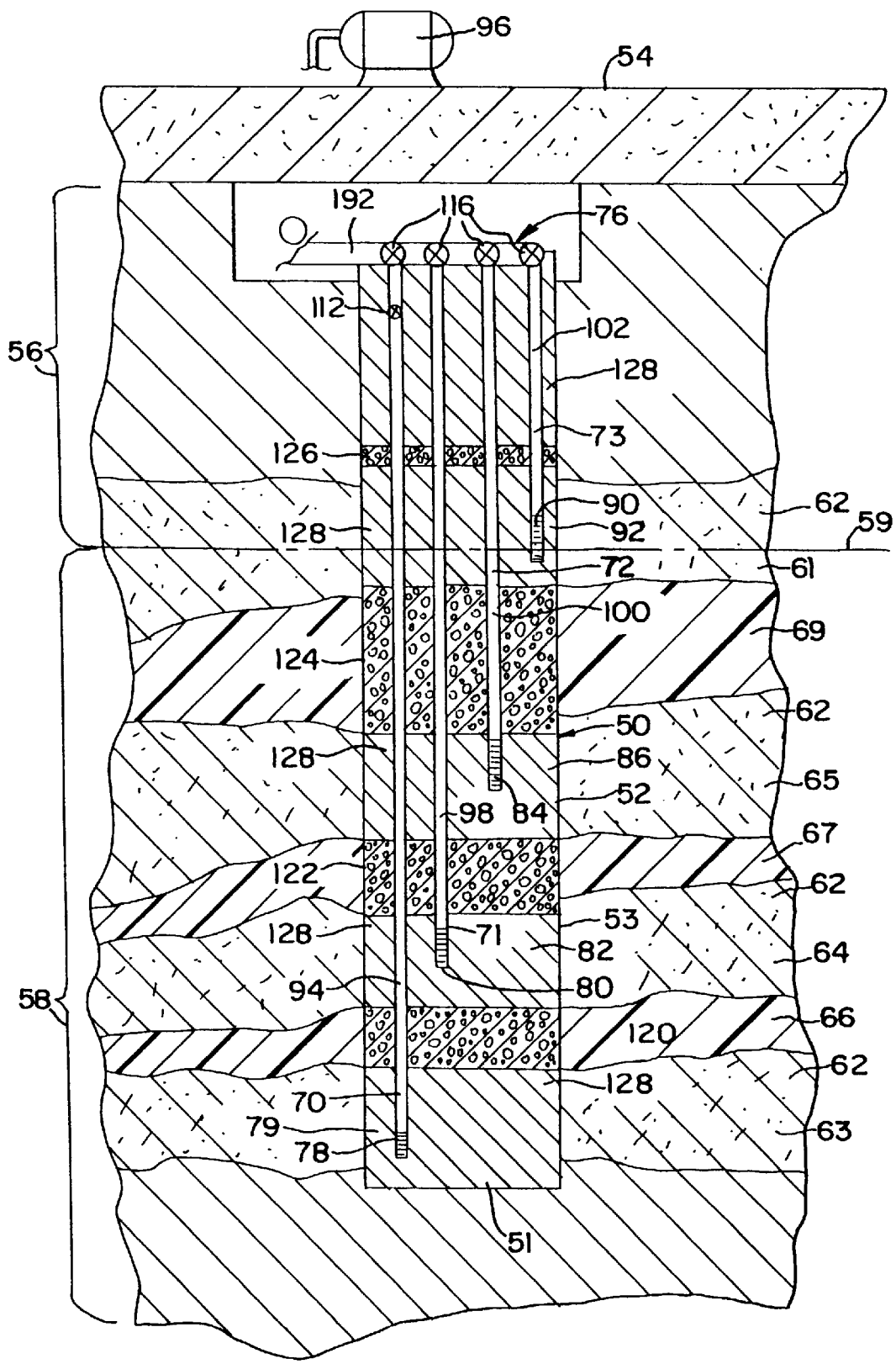
FIG. 6 is a cross-section of a contaminated aquifer, showing another embodiment of the apparatus of the present invention for injecting a fluid into the aquifer, along with an extraction well.

There may also be a third level or zone of contaminated ground 65 that may be either partially or completely separated from the other levels or zones 63, 64 by another less permeable level or zone 67. The contaminated levels or zones and the less permeable levels or zones may be in both the saturated and unsaturated zones or levels 56, 58 of the ground. As shown in FIG. 6, the saturated and unsaturated zones 56, 58 of the subsurface ground can include other less permeable zones, such as less permeable zone 69, with another contaminated zone 61 between the third less permeable zone 69 and the surface 54 of the ground.

Each fluid transfer well 50 of the present invention is used for transferring fluid to the subsurface ground at multiple levels or depths. Each fluid transfer well 50 has a bottom 51 and a side wall 53 defining the well bore hole 52. Each fluid transfer well 50 also has a plurality of fluid transfer devices. As shown in the embodiment of FIG. 2, there may be three fluid transfer devices 70, 71, 72 in each fluid transfer well, for example. In the embodiment of FIG. 6, there are four fluid transfer devices 70, 71, 72, 73 in the bore hole 52 of a single fluid transfer well 50. It should be understood that the number of fluid transfer devices shown in each fluid transfer well of FIGS. 2 and 6 is for purposes of illustration only; the actual number of fluid transfer devices used in a particular fluid transfer well will depend on a number of variables, such as the site conditions and assembly and installation constraints, and a particular system may have fewer or more fluid transfer devices in each fluid transfer well.

Alternatively, it may be desirable to provide a single standard grouping of fluid transfer devices that may be individually controlled as described below. The embodiments of FIGS. 2 and 6 have been chosen and described to explain the principles of the present invention and its application and practical use to enable others skilled in the art to utilize its teachings. It should be understood that the preferred and alternative embodiments herein described are not intended to be exhaustive or to limit the invention to the precise forms disclosed.

The plurality of individual fluid transfer devices 70, 71, 72, 73 of each embodiment are grouped into an assembly 76. Portions of each assembly 76 are received in a single bore hole 52 of a single fluid transfer well 50. The first fluid transfer device 70 has a first fluid discharge section or transfer section 78 positioned within the well bore hole 52 at a first vertical level 79 between the bottom 51 of the well and the ground surface 54; the second fluid transfer device 71 has a second fluid discharge section or transfer section 80 positioned within the same well bore hole at a second vertical level 82 between the first vertical level 79 and the ground surface 54; the third fluid transfer device 72 has a third fluid discharge section or transfer section 84 positioned within the same well bore hole at a third vertical level 86 between the second vertical level 82 and the ground surface 54. The fluid discharge section or transfer section 78, 80, 84 for each fluid transfer device 70, 71, 72 has at least one outlet or opening 88 for the flow of fluid therefrom into the surrounding area of the bore hole 52. Each individual fluid discharge section or transfer section 78, 80, 84 may comprise a hollow well screen with a plurality of outlets or openings 88 through which the fluid may travel between the well bore hole and the interior of the fluid discharge section or transfer section.

Alternatively, each individual fluid discharge section or transfer section 78, 80, 84 may comprise a length of pipe with a single outlet or opening for fluid flow into and out of the well bore hole, and variations between a single opening and a screen with multiple openings may be used. It should also be understood that the size and distribution of the openings may be set to control the fluid flow. For example, the fluid discharge section or transfer section could have a length of 2 feet, 25 feet or 100 feet, with openings distributed throughout the length of the transfer section. There could also be separate spaced segments in the fluid discharge section or transfer section, with sections having openings interspersed with solid sections. The length of each fluid discharge section or transfer section could also be keyed to the thickness of the layer of contaminated ground between the lenses of low permeability material so that fluid may be transferred along the entire thickness of contaminated ground. Thus, it should be understood that the present invention is not limited to any particular type, size or distribution of opening, and is not limited to any particular type of fluid discharge section or transfer section unless expressly set forth in the claims. It should also be understood that if flow is reversed to use the same well for fluid extraction, the fluid transfer sections 78, 80, 84 would comprise inlet sections and the openings 88 would comprise inlets. Thus, "transfer" is intended to include both flow into and out of the fluid transfer device and "opening" is intended to include both an inlet and an outlet.

It should also be understood that there may be a fourth fluid discharge section or transfer section 90 at a fourth vertical level 92, as in the embodiment of FIG. 6, or there may be fewer or more discharges or transfer sections depending on the site.

The first fluid discharge or transfer section 78 of the first fluid transfer device 70 is axially connected to a first riser conduit 94 that extends up from the first fluid discharge or transfer section 78 toward the ground surface 54. The first riser conduit 94 is connected to receive fluid from a fluid source 96 above the ground surface 54, and is connected to supply fluid to the first fluid discharge or transfer section 78. The second fluid discharge or transfer section 80 of the second fluid transfer device 71 is axially connected to a second riser conduit 98 that extends up from the second fluid discharge or transfer section 80 toward the ground surface 54. The second riser conduit 98 is connected to receive fluid from the fluid source 96, and is connected to supply fluid to the second fluid discharge or transfer section 80. The third fluid discharge or transfer section 84 of the third fluid transfer device 72 is axially connected to a third riser conduit 100 that extends up from the third fluid discharge or transfer section 84 toward the ground surface 54. The third riser conduit 100 is connected to receive fluid from the fluid source 96 above the ground surface, and is connected to supply fluid to the third fluid discharge or transfer section 84. In the embodiment of FIG. 6, the fourth fluid discharge or transfer section 90 of the fourth fluid transfer device 73 is axially connected to a fourth riser conduit 102 that extends up from the fourth fluid discharge or transfer section 90 toward the ground surface 54. The fourth riser conduit is connected to receive fluid from the fluid source 96 above the ground surface, and is connected to supply fluid to the fourth fluid discharge or transfer section 90.

As shown in FIG. 2, each riser conduit 94, 98, 100 may be connected to receive fluid through an individual connecting line 104, 106, 108 that is connected to receive fluid from a manifold 110 that is connected to the fluid source 96. There may preferably be individual unidirectional check valves 112 in each connecting line 104, 106, 108 to minimize back-flushing of silt into the fluid transfer device during pulsed fluid transfer. A flow meter 114 and flow control valve 116 may preferably also be provided in each connecting line 104, 106, 108 to control each fluid transfer device 70, 71, 72, 73; thus, the volume of fluid injected at each vertical level 79, 82, 86, 92 can be controlled.

The fluid supply source 96 may comprise a source of pressurized gas, such as an air tank or compressor if the system is used in an air sparging process. Alternatively, the fluid supply source could comprise a source of gaseous oxidant or liquid oxidant, such as tank containing Fenton's Reagent or potassium permanganate or an ozone generator. The fluid supply source 96 could also comprise a tank of microbes suspended in a liquid nutrient medium, for example. In the illustrated embodiments, each fluid transfer device of the transfer well is connected to a single common source of fluid, and several fluid transfer wells may all be connected to the same fluid source. Alternatively, it may be desirable to connect each fluid transfer device to a separate fluid source; the separate fluid sources may supply the same or different fluids to each fluid transfer device. For example, if one of the fluid transfer devices is used to transfer a liquid to the ground, another of the fluid transfer devices with its opening 88 at a deeper level could be connected to a gas source to release gas into the ground to thereby promote mixing of the liquid in the ground. It should be understood that in some instances it may be desirable to disconnect the fluid supply source 96 and instead connect some or all of the individual connecting lines to a vacuum pump, for example, to reverse the process and draw contaminants out of the ground. If one or more of the transfer sections 78, 80, 84, 90 is below the water table, the associated individual connecting line could also be connected to a pump to withdraw a sample of the groundwater for testing or treatment, for example.

As shown in FIGS. 2 and 6, each fluid transfer well 50 in the illustrated embodiments has a lower seal in the well bore hole 52 between the first and second discharges or transfer sections 78, 80, that is, between the first and second vertical levels 79, 82. The lower seal 120 surrounds the first riser conduit 94 and extends to the side wall 53 of the bore hole 52. A second seal 122 is in the well bore hole 52 above the first seal 120 and between the second and third discharges or transfer sections 80, 84, that is, between the second and third vertical levels 82, 86. The second seal 122 surrounds the second riser conduit 98 and extends to the side wall 53 of the well bore hole 52. A third seal 124 is in the well bore hole 52 above the second seal 122 and above the third fluid discharge or transfer section 84. The third seal 124 surrounds the third riser conduit 100 and extends to the side wall 53 of the well bore hole 52. In the embodiment of FIG. 6, a fourth seal 126 is in the well bore hole above the third seal 124 and above the fourth fluid discharge or transfer section 90. The fourth seal 126 surrounds the fourth riser conduit 102 and extends to the side wall 53 of the well bore hole 52. The well bore hole 52 volumes between the seals 120, 122, 124,126 and between the bottom 51 of the bore hole 52 and the first seal 120 are filled with a fill material 128 of high fluid permeability, such as sand.

In the illustrated embodiments, the seals 120, 122, 124, 126 are all made of bentonite. Other materials can be used for the seals 120, 122, 124, 126, such as cements, grouts and other commercially available sealing materials used in the art. The thickness of each seal and material used for the seals may vary, but the seals should be of a size and material that prevents venting of the fluid between sealed sections of the well bore hole. The seals 120, 122, 124, 126, side wall 53 of the well bore hole 52 and fill material 128 have fluid permeabilities that establish separate fluid flows: one fluid flow is between the first fluid discharge or transfer section 78 and the fill material 128, and between the fill material 128 and side wall 53 of the well bore hole 52 below the first seal 120; another flow is between the second fluid discharge or transfer section 80 and the fill material 128, and between the fill material 128 and side wall 53 of the well bore hole 52 between the first and second seals 120, 122; another flow is between the third fluid discharge or transfer section 84 and the fill material 128, and between the side wall 53 of the well bore hole 52 between the second and third seals 122, 124; and in the embodiment of FIG. 6, another flow is between the fourth fluid discharge or transfer section 90 and the fill material 128 and between the side wall 53 of the well bore hole 52 between the third and fourth seals 124, 126. To create such flows, a one foot thick layer of bentonite should create an effective seal that prevents venting, although greater thicknesses could be used, such as three or five feet, for example. In addition, it is desirable that the thicknesses of the seals be keyed to the thicknesses of the adjacent low permeability zones 66, 67, 69; the seals should be placed to correspond with the depths of the low permeability zones or levels to induce fluid flow into the appropriate formation. In some instances, it may be desirable to seal the well bore hole for the length of each riser conduit 94, 98, 100, 102 between the fluid discharge or transfer sections 78, 80, 84, 90.

In the embodiment of FIG. 2, the first and second riser conduits of the first and second fluid transfer devices are co-axial in the well bore hole. As shown in the exploded view of FIG. 3, the third fluid transfer device 72 has a bottom end 130 and the third fluid discharge or transfer section 84 comprises a 2-inch diameter hollow screen section of PVC pipe, about two feet in length, with a threaded top end and a plurality of openings 88 in the side wall. At the lower end of the screen transfer section, a coupler 132 and an end cap 134 are connected to the screen section 84. An example of a suitable end cap is shown in FIG. 4; the end cap has a central bore 136 having a diameter of about 1-¼ inch. The third riser conduit 100 comprises a pair of hollow PVC pipes 138, 140, each with a 2 inch outer diameter. The third riser conduit 100 has a top end 142 at the top of the second PVC tube 140. The screen section 84 is threaded onto the bottom end of one of the riser pipe sections 138, which is threaded onto the bottom end of the other riser pipe section 140. The lengths of the riser pipes 138, 140 may be standard lengths, and the total length of the riser conduit 100 may vary depending on the geologic conditions at the site: the total length of the assembled riser conduit 100 and fluid transfer section 84 should be such that the third fluid transfer section 84 avoids low-conductivity geologic formations or embedded low conductivity silt or clay lenses, to optimize the zone of influence for the gas discharged and maximize efficiency. The top end 142 of the riser conduit 100 is connected to one of the co-axial openings of a 2 inch PVC T-coupler 144. The opposite co-axial opening of the T-coupler receives a 2 inch end cap 146, center drilled for a 1-¼ inch diameter bore. The end cap 146 may have a structure like that shown in FIG. 4 for the end cap 134 at the opposite end of the device 72. The third opening of the T-coupler 144 receives a 2 inch by ½ inch hex reducing bushing 148 which receives a ½ inch hose barb 150 which is connected to one of the connecting lines 106 leading to the source of pressurized gas 96.

Also as shown in FIG. 2 and in the exploded view of FIG. 3, the second fluid transfer gas device 71 has a bottom end 152 and the second fluid discharge or transfer section 80 comprises a 1-¼ inch diameter hollow screen section of PVC pipe, about two feet in length, with a threaded top end and a plurality of openings 88 in the side wall. At the lower end of the screen section 80, a coupler 154 and an end cap 156 are connected to the screen 80. The end cap 156 has a central bore having a diameter of about one-half inch. The end cap may be structured like that shown in FIG. 4, with a smaller size, with a central bore of smaller diameter. The second riser conduit 98 comprises a pair of hollow PVC riser pipes 158, 160 each with a 1-¼ inch outer diameter. The riser conduit 98 has a top end 162. The screen section 80 is threaded onto the bottom end of one of the riser pipes 158, which is threaded onto the bottom end of another riser pipe 160 to form the riser conduit 98. The lengths of the riser pipes 158, 160 may be standard lengths, and the total length of the riser conduit 98 may vary depending on the geologic conditions of the site: the total length of the assembled riser conduit 98 and fluid discharge or transfer section 80 should be such that the fluid discharge or transfer section 80 avoids low-conductivity geologic formations or embedded low conductivity silt or clay lenses, to optimize the zone of influence for the fluid transferred or discharged and maximize efficiency. The top end 162 of the riser conduit 98 is connected to one of the coaxial openings of a 1-¼ inch PVC T-coupler 164. The opposite co-axial opening of the T-coupler receives a 1-¼ inch end cap 166, center drilled for a one-half inch diameter bore. The end cap 166 may have a structure like that shown in FIG. 4, having a smaller size and a smaller diameter bore. The third opening of the T-coupler receives a 1-¼ inch hex reducing bushing 168 which receives a ½ inch hose barb 170 which is connected to one of the connecting lines 106 leading to the source of pressurized gas 96.

As shown in the exploded view of FIG. 3, the first fluid transfer device 70 has a bottom end 172 and the first fluid discharge or transfer section 78 comprises a ½ inch diameter hollow screen section of PVC pipe, about 2-½ feet in length, with a threaded top end and a plurality of openings 88 in the side wall. At the bottom end 174 of the first screen section 78, an end cap 176 is connected to the screen. The end cap 176 is solid, with no central bore. The first riser conduit 94 comprises a pair of hollow PVC pipes 178, 180 each with a ½ inch outer diameter. The screen section 78 is threaded onto the bottom end of one of the riser pipes 178, which is threaded onto the bottom end of another riser pipe 180. The lengths of the riser pipes 178, 180 may be standard lengths, and the total length of the riser conduit 94 may vary depending on the geologic conditions of the site: the total length of the assembled riser conduit 94 and gas discharge 78 should be such that the fluid discharge or transfer section 78 avoids low-conductivity geologic formations or embedded low conductivity silt or clay lenses, to optimize the zone of influence for the fluid discharged and maximize efficiency. The top end 182 of the riser conduit 94 is connected to one of the openings of a ½ inch 90° elbow 184 which is connected to a ½ inch horizontal PVC pipe section 186, a ½ inch female adapter 188 and a ½ inch hose barb 190. The hose barb 190 is connected to one of the connecting lines 108 leading to the source of pressurized gas 96.

As described above, in the FIG. 2 embodiment PVC materials have been used, although it should be understood that the material selected for the components of the apparatus should be compatible with the fluid or fluids being transferred and with the exterior fill material 128, and be capable of withstanding the operating pressures for the fluid. Thus, stainless steel or Teflon (polytetrafluoroethylene) components may be used in some instances.

Attachments between components may be through threaded connections, adhesion, welding, combinations of these connecting means, or any other connecting means appropriate for the material. For the connections of sections of riser conduits and other joints received within another component, it is preferable to use a flush connection to provide a flush exterior; thus, components may be internally coupled rather than externally coupled. The diameters of the components should be selected to provide adequately-sized fluid flow paths; thus, the annular open volumes in the coaxial members, such as between the first and second riser conduits 94, 98 and between the second and third riser conduits 98, 100, should be adequately sized for the desired flow rate and to the annular area should be great enough for the passage of the internally-carried components, such as any fitting joining sections of the riser conduits.

It should be understood that the dimensions and materials identified for the abovedescribed embodiment have been provided for purposes of illustration only, and the invention is not limited to any particular materials or dimensions unless the claims expressly call for such materials or dimensions.

The end caps 166, 156 of the second assembly preferably form annular seals around the first riser conduit 94 at the bores at the top and bottom ends of the second fluid transfer device 71. The first and second riser conduits 94, 98 provide an annular second fluid flow path down through the second riser conduit 98 and around the outside of the first riser conduit 94 to the second fluid transfer section 80. The top and bottom annular seals formed by the end caps 166, 156, the second riser conduit 98, the second fluid discharge or transfer section 80 and the first riser conduit 94 cooperate to establish a preferential fluid flow path in the second riser conduit 98 to flow out of the openings 88 of the second fluid discharge or transfer section 80. The end caps 146, 134 of the third assembly preferably form annular seals around the second riser conduit 98 at the bores at the top and bottom ends of the third fluid transfer device 72. The second and third conduits 98, 100 provide an annular third fluid flow path down through the third riser conduit 100 and around the outside of the second riser conduit 98 to the third fluid discharge or transfer section 84. The top and bottom annular seals formed by the end caps 146, 134, the third riser conduit 100, the third fluid discharge or transfer section 84 and the second riser conduit 98 cooperate to establish a preferential fluid flow path in the third riser conduit 100 to flow out of the openings 88 of the third fluid discharge or transfer section 84. All of the end caps 134, 146, 156, 166 and 176 may have the structure illustrated in FIG. 4, sized appropriately for the size of pipe at that section.

In the embodiment of FIG. 6, the first, second, third and fourth riser conduits 94, 98, 100, 102 have spaced, vertical longitudinal axes in the well bore hole 52. Each riser conduit 94, 98, 100, 102 may have the same diameter or different diameters, and they may comprise, for example, ½ inch outer diameter, 1-¼ inch outer diameter, or 2 inch outer diameter PVC pipes, or some combination of these sizes of materials. As shown, each individual riser conduit may be connected to a manifold 192, through control valves 116, and check valves 112 may be placed above ground at the fluid source 96 or below ground at the intersection of the riser conduit and fluid discharge or transfer section, as shown for the first fluid transfer device 70 in FIG. 6.

Thus, in both embodiments of the present invention, multiple fluid transfer zones, at multiple vertical levels, are provided in a single bore hole. Both embodiments enjoy the advantages of multiple fluid transfer wells in separate bore holes of varying depths in that the adverse consequences of non-homogeneous hydrogeologic conditions may be avoided. Both embodiments avoid one of the disadvantages of multiple fluid transfer wells in separate bore holes of varying depths in that costs are substantially reduced; reducing the number of bore holes that must be drilled reduces construction costs.

It is not necessary to use separate wells for all methods of remediating contaminated ground. And where it is desirable to extract materials from the ground, such as in vapor extraction or air sparging operations, the existing fluid transfer wells 50 could be used, with the operation reversed to extract contaminants from the various levels of the ground. Or, additional wells of the same structure as those shown in FIGS. 2 and 6 for the injection wells could be used and connected to a vacuum or pump 212 instead of to a fluid source 96. In either case, the transfer sections 78, 80, 84, 90 of each fluid transfer device would be used as a fluid inlet rather than as a fluid discharge. If separate extraction wells are to be used with the fluid transfer system, the extraction wells may also be of standard construction, as shown at 200 in FIGS. 2 and 6, having an extraction well bore hole 202 with a bottom 204 and a side wall 206, and an extraction conduit 208 in the well bore hole 202. The illustrated extraction conduit 208 has at least one inlet 210 for fluid to flow from the extraction well bore hole 202 into the extraction conduit 208. A vacuum source 212, such as a pump, is connected to draw fluid from the contaminated areas 63, 64, 65 of the subsurface area of ground through the side wall 206 of the extraction well bore hole and into and through the fill material 214 and the extraction conduit 208. The injection well bore hole 52 is isolated from the extraction conduit 208. From the vacuum source 212, the fluid may be released to the atmosphere, routed to a treatment facility, or circulated to a compressor for reintroduction into the injection well after treatment to remove contaminants.

As shown in FIG. 5, the fluid transfer system 49 may employ a plurality of multi-level injection wells 50 and extraction wells 200. Depending on the site geologic conditions, it may be possible to use a combination of traditional single-level sparge wells 220 and multi-level sparge wells 50.

In the process of the present invention, an injection well 50 is established that includes at least a first and second fluid transfer device 70, 71 in a single injection well bore hole 52. Fluid is introduced into the first riser conduit 94 and into the second riser conduit 98. The fluid flows down through the riser conduits 94, 98 and out through the first and second fluid discharge sections 78, 80 to the well bore hole 52. The first fluid stream flows out from the first discharge section 78, through the fill material 128 in the well bore hole 52 and through the side wall 53 of the well bore hole between the bottom 51 and the lower seal 120 and into the first zone 63 of contaminated subsurface ground. The second fluid stream flows out from the second fluid discharge section 80, through the fill material 128 in the well bore hole 52 and through the side wall 53 of the injection well bore hole between the first and second seals 120, 122 and into the second zone 64 of contaminated subsurface ground. In the embodiments illustrated in FIGS. 2 and 6, fluid may also be introduced into the third riser conduit 100 to flow through the third fluid discharge section 84 opening 88 into the well bore hole 52, out through the fill material 128 and the side wall 53 of the well bore hole between the second and third seals 122, 124 and into a third zone or level 65 of contaminated subsurface ground. In the embodiment of FIG. 6, fluid may be introduced into the fourth riser conduit 102 to flow through the fourth fluid discharge section 90 opening 88 into the well bore hole 52 and out through the side wall 53 of the well bore hole 52 between the third and fourth seals 124, 126 and out into a fourth contaminated zone or level 61.

When the system is used for air sparging, an extraction well 200 is established at a location spaced from the injection well, and the injected fluid comprises a gas such as air. The injected gas volatizes liquid contaminants in the subsurface ground. Volatized contaminants in the first and second zones or levels 63, 64 in the saturated level or zone 58 move into the unsaturated level or vadose zone 56. A withdrawing force is applied to the extraction conduit 208 which draws volatized contaminant from the vadose or unsaturated zone or level 58. When sparging gas is also introduced into the third riser conduit 100, contaminants in the third zone or level 65 in the unsaturated level 58 are also volatized, and the withdrawing force also draws these volatized contaminants to the extraction well 200. Similarly, for a fourth contaminated level or zone 61, volatized contaminants in the fourth zone or level 61 of the unsaturated level or zone 58 are drawn to the extraction well 200. The direction of flow through the zones 63, 64, 65 is shown in FIG. 2 with arrows leading from the injection well to the unsaturated zone or level 58 and to the extraction well 200. It should be understood that with additional injection and extraction wells, the fluid from one injection well can be drawn to different extraction wells, and one extraction well may draw contaminants vaporized by gas injected by more than one sparge well.

For a sparging operation, the fluid that is used is a pressurized gas, preferably air so that the contaminants may be air stripped, although other gases could be used. At the ground surface, the combination of air and vaporized contaminants may be released, treated and released, or treated and recycled.

As discussed above, the apparatus of either embodiment may be used as a fluid extraction device in either a sparging or vapor extraction system.

When the system, apparatus and process of the present invention are used for injecting a liquid oxidant into the ground, the system, apparatus and process can be used to force mixing of the injected liquid oxidant in the ground. This forced mixing may be accomplished, for example, by injecting the liquid oxidant at one level and injecting a gas, such as air or nitrogen, at another level. Thus, the liquid oxidant could be introduced through the second transfer or discharge section 80, and the gaseous nitrogen or air could be introduced simultaneously through the first transfer or discharge section 78. Thus, as the mixing gas percolates upward through the ground, the gas bubbles force the liquid oxidant to mix with the groundwater in the ground to increase the degree of contact between the oxidant and the contaminants. In this use, it should be understood that the level of the first and second discharges or transfer sections may be independent of any lenses in the ground, and that this use of the apparatus and process of the present invention may also be effective in the case of ground having a homogeneous permeability. Moreover, it should be understood that the use of the present invention as a forced mixer is not limited to mixing liquid oxidant, but may be used with other fluids in other remedial methods and systems as well.

The present invention allows for multiple streams of fluid to travel through the contaminated subsurface ground. The multiple streams may be both above and below any areas of low permeability, such as areas 66 and 67 in FIG. 2, and areas 66, 67 and 69 in FIG. 6, to improve the efficacy of the remedial process or processes. The multiple streams may also be of dissimilar fluids, such as a liquid and a gas, to force improved mixing of one of the fluids in the ground.

The present invention also allows for adjustment of the system over time. For example, it may be desirable to apply a greater volume of fluid at one level than another, and the control valves 114 allow for such adjustments. Moreover, the type of fluid used may vary over time; for example, air sparging taking place for some time with microbes or oxidants injected at other times.

The embodiments of FIGS. 2 and 6 may be used in conjunction with soil or groundwater contaminant recovery technology of the type described in U.S. Pat. Nos. 5,050,677, 4,730,672, 4,890,673, 4,945,988 and 5,342,147, the disclosures of which are incorporated by reference herein in their entireties.

To assemble the apparatus 76 of the embodiment shown in FIGS. 2–4, it is generally preferable to assemble the apparatus on site, over the well bore hole 52, particularly for deep wells requiring long riser conduits 94, 98, 100. The first fluid discharge or transfer section 78 of the desired length and pattern of openings 88 is selected and the end cap 176 is placed at the bottom end of the transfer section and sealed by any suitable means, such as through a threaded connection, gluing or welding. Next a section of riser pipe 178 may be connected to the top end of the first fluid discharge or transfer section 78 such as through a threaded connection and sealed.

From the desired depth for the second fluid discharge or transfer section 80, the proper location for the coupler 154 and end cap 156 on the first riser pipe 178 may be determined, and the end cap 154 and coupler 154 may be pushed down the first riser pipe 178 to the desired position and then fixed and sealed in place by any suitable means, such as by gluing or welding. The second fluid discharge or transfer section 80 is then slid down over the first riser pipe 178 and connected and sealed to the coupler 154 by any suitable means. A section of riser pipe 158 may then be slid down over the first riser pipe 178 and connected to the top end of the second fluid discharge or transfer section 80. Additional sections of riser pipe may be connected to the free ends of the first and second riser pipes 178, 158 to achieve the desired depths for the fluid discharge or transfer sections 78, 80; preferably, for ease of assembly, the free top end of the innermost riser pipe should not be covered by the overlying riser pipe so that assembly may continue from the innermost pipe outward.

From the desired depth for the third fluid discharge or transfer section 84, the proper location for the coupler 132 and end cap 136 may be determined, and the end cap 136 and coupler 132 may be pushed down the outermost riser pipe, such as the second riser pipe 158, to the desired position and then fixed and sealed in place by any suitable means. The third fluid discharge or transfer section 84 may then be slid down over the outermost riser pipe and connected and sealed to the coupler 132 by any suitable means. A section of riser pipe 138 may then be slid down over the outermost riser pipe, such as riser pipe 158, and connected to the top end of the third fluid discharge or transfer section 84. Additional sections of riser pipe may be connected to the free ends of the first, second and third riser pipes 178, 158, 138 to achieve the desired depths for the fluid discharge or transfer sections 78, 80, 84; preferably, for ease of assembly, the free top end of the innermost riser pipe should not be covered by the overlying riser pipe, and the top end of the middle riser pipe should not be covered by the outermost riser pipe so that assembly may continue from the innermost pipe outward.

After enough riser pipe sections have been added so that the fluid discharge or transfer sections 78, 80, 84 will be at the appropriate depths, the top end of the first riser conduit 94 should be exposed above the top end of the second riser conduit 98 which should be exposed above the top end of the third riser conduit 100. One T-coupler 144 and end cap 146 may then be slid down over the first and second riser conduits 94, 98 and connected to the top end of the third riser conduit 100 be any suitable means, with the first and second riser conduits 94, 98 extending out through the top of the T-coupler 144 and end cap 146. The next T-coupler 164 and end cap 166 may then be slid down over the first riser conduit 94 and connected to the top end of second riser conduit 94, with the first riser conduit 94 extending out through the top of the T-coupler 164 and the end cap 166. The top end of the first riser conduit 94 may then be connected to the elbow 184 by any suitable means. All of the bushings or adapters 148, 168, 188 may then be connected to the T-couplers 144, 164 and elbow 184 by any suitable means and the barbs 150, 170, 190 may be attached to the bushings 148, 168, 188. The connecting lines 104, 106, 108 may then be connected to the barbs 150, 170, 190 and to the fluid source 96.

It should be understood that the well bore hole 52 may be filled with the fill material 128 and the seals 120, 122, 124 may be constructed as the fluid transfer apparatus is assembled. It should also be understood that the above-description of the assembly of the apparatus is provided for purposes of illustration only; other assembly methods may be used.

Assembly of the apparatus of the FIG. 6 embodiment may be done in a similar manner, on site and over the well bore hole 52, but each fluid transfer device 70, 71, 72, 73 may be built separately and then assembled into the single apparatus.

While only specific embodiments of the invention have been described and shown, it is apparent that various alterations and modifications can be made therein. It is, therefore, the intention in the appended claims to cover all such modifications and alterations as may fall within the scope and spirit of the invention.

We claim:

1. A multi-level fluid transfer system for remediating a subsurface area of ground having a contaminated area, the system comprising:

a fluid source;

a well comprising a well bore hole and first and second fluid transfer devices, the well bore hole extending down from the ground surface and having a side wall and a bottom;

the first fluid transfer device having a first discharge section and a first riser conduit, the first discharge section being positioned within the well bore hole at a first level between the bottom and the ground surface, the first riser conduit extending up from the first discharge section toward the ground surface, the first riser conduit being connected to supply fluid to the first discharge section, the first discharge section including an outlet for the flow of fluid therefrom into the well bore hole; and the second fluid transfer device having a second discharge section, and a second riser conduit, the second discharge section being positioned within the same well bore hole at a second level between the first discharge section and the ground surface, the second riser conduit extending up from the second discharge section toward the ground surface, the second riser conduit being connected to supply fluid to the second discharge section, the second discharge section including an outlet for the flow of fluid therefrom into the well bore hole;

wherein no part of the well bore hole is used for extracting fluid from the subsurface area of ground.

2. The multi-level fluid transfer system of claim 1 wherein the system is a multi-level gas sparging system and the source of fluid comprises a source of gas and the first fluid transfer device comprises a first gas sparge device and the second fluid transfer device comprises a second gas sparge device.

3. The multi-level fluid transfer system of claim 1 further comprising:

a third fluid transfer device having a third discharge section and a third riser conduit, the third discharge section being positioned within the same well bore hole at a third level between the second discharge section and the ground surface, the third riser conduit extending up from the third discharge section toward the ground surface, the third riser conduit being connected to deliver fluid to the third discharge section, the third discharge section including an outlet for the flow of fluid therefrom into the well bore hole; and a third seal in the well bore hole between the third discharge section outlet and the surface of the ground, the third seal and the side wall of the well bore hole between the third seal and the second seal having permeabilities to establish a flow of fluid from the third discharge section out through the side wall of the well bore hole between the second and third seals and into the surrounding subsurface area of the ground.

4. The multi-level fluid transfer system of claim 1 further comprising:
  a lower seal in the well bore hole between the first and second discharge sections;
  a second seal in the well bore hole above the second discharge section;
  the lower seal and the side wall of the well bore hole between the lower seal and the bottom of the well bore hole having permeabilities to establish a flow of fluid from the first discharge section out through the side wall of the well bore hole and into the surrounding subsurface area of the ground; and
  the second seal and the side wall of the well bore hole between the lower seal and the second seal having permeabilities to establish a flow of fluid from the second discharge section out through the side wall of the well bore hole between the lower and second seals and into the surrounding area of the ground.

5. The multi-level fluid transfer system of claim 4 wherein the first and second riser conduits are co-axial in the well bore hole.

6. The multi-level fluid transfer system of claim 5 wherein the second fluid transfer device has a bottom end, the second riser conduit comprises a hollow tube with a top end and an inner and outer diameter, the first riser conduit extending through the second riser conduit and second discharge section and being sized to provide a fluid flow path around the outer diameter of the first riser conduit along the length of the second riser conduit, the second fluid transfer device further including a top annular seal at the top end of the second riser conduit and a bottom annular seal at the bottom end of the second fluid transfer device, wherein the top and bottom annular seals, the second riser conduit, the second discharge section and the first riser conduit cooperate to establish a preferential flow path for fluid in the second riser conduit to flow out of the second discharge section outlet.

7. The multi-level fluid transfer system of claim 1 further comprising an extraction well comprising an extraction well bore hole having a bottom and a side wall, an extraction conduit in the extraction well bore hole and having an inlet for fluid to flow from the extraction well bore hole into the extraction conduit, and a vacuum source connected to draw fluid from the contaminated area of the subsurface area of ground through the side wall of the extraction well bore hole and into and through the extraction conduit, the extraction conduit being isolated from the first well bore hole containing the first and second fluid transfer devices.

8. The multi-level fluid transfer system of claim 1 in combination with a subsurface area of ground having a contaminated area, wherein the contaminated area of ground includes a first section and a second section, and wherein the subsurface area of ground includes an intermediate section that is less permeable to the fluid, the intermediate section extending between the first and second sections of the contaminated area, the first discharge section being below the intermediate section and the second discharge section being above the intermediate section.

9. The multi-level fluid transfer system of claim 1 wherein the first and second fluid transfer devices comprise an assembly.

10. The multi-level fluid transfer system of claim 9 wherein the first and second riser conduits have spaced, vertical central longitudinal axes.

11. The multi-level fluid transfer system of claim 1 further comprising a third fluid transfer device having a third discharge section and a third riser conduit, the third discharge section being positioned within the same well bore hole at a third level between the second discharge section and the ground surface, the third riser conduit extending up from the third discharge section toward the ground surface, the third riser conduit being connected to deliver fluid to the third discharge section, the third discharge section including an outlet for the flow of fluid therefrom into the well bore hole.

12. The multi-level fluid transfer system of claim 1 wherein the first and second riser conduits are connected to a single common source of fluid.

13. The multi-level fluid transfer system of claim 1 in combination with the subsurface area of ground, wherein the first and second levels are in a fluid saturated zone of the ground.

14. The multi-level fluid transfer system of claim 1 in combination with the subsurface area of ground, wherein the first and second levels are in the vadose zone of the ground.

15. In combination, a fluid source, a well comprising a well bore hole having a length and diameter and a multi-level fluid transfer apparatus in the well bore hole, the apparatus comprising:
  a first fluid transfer device having a first fluid transfer section and a first riser conduit, the first riser conduit having a top and a bottom, the first fluid transfer section having an opening, the first fluid transfer section extending from the bottom of the first riser conduit, the first fluid transfer device having a longitudinal axis along the first riser conduit and first fluid transfer section; and
  a second fluid transfer device having a second fluid transfer section and a second riser conduit, the second riser conduit having a top end and a bottom end, the second fluid transfer section having an opening, the second fluid transfer section extending from the bottom of the second riser conduit, the second fluid transfer device having a longitudinal axis along the second riser conduit and second fluid transfer section, the longitudinal axis of the second fluid transfer device being co-axial with the longitudinal axis of the first fluid transfer device;
  the first riser conduit extending through the second riser conduit, the top of the first fluid transfer section being spaced from the bottom of the second fluid transfer section, the top of the first riser conduit being spaced beyond the top of the second riser conduit;
  the inner diameter of the second riser conduit being spaced from the outer diameter of the first riser conduit;
  wherein fluid flow through each conduit is substantially downward and wherein the well bore hole is isolated from any conduit with upward fluid flow.

16. The apparatus of claim 15 further comprising
  a third fluid transfer device having a third discharge section and a third riser conduit, the third riser conduit having a top end and a bottom end, the third discharge section having top and bottom ends and an opening, the top end of the third discharge section being connected to the bottom end of the third riser conduit, the third fluid transfer device having a longitudinal axis along the third riser conduit and third discharge section, the longitudinal axis of the third fluid transfer device being co-axial with the longitudinal axis of the first and second fluid transfer devices; and
  the first riser conduit and the second riser conduit extending through the third riser conduit, the top of the second discharge section being spaced from the bottom of the third discharge section, the tops of the first and second riser conduits being spaced beyond the top of the third riser conduit;
  the inner diameter of the third riser conduit being spaced from the outer diameter of the second riser conduit.

17. The apparatus of claim 15 further comprising a top annular seal at the top end of the second riser conduit and a bottom annular seal at the bottom end of the second discharge section, the top and bottom annular seals, the second riser conduit, the second discharge section and the first riser conduit cooperating to establish a preferential fluid flow path through the second riser conduit to the second discharge section.

18. The apparatus of claim 17 further comprising:
a third fluid transfer device having a third discharge section and a third riser conduit, the third riser conduit having a top end and a bottom end, the third discharge section having top and bottom ends and an outlet, the top end of the third discharge section being connected to the bottom end of the third riser conduit, the third fluid transfer device having a longitudinal axis along the third riser conduit and third discharge section, the longitudinal axis of the third fluid transfer device being co-axial with the longitudinal axis of the first and second fluid transfer devices;

the first riser conduit and the second riser conduit extending through the third riser conduit, the top of the second discharge section being spaced from the bottom of the third discharge section, the tops of the first and second riser conduits being spaced beyond the top of the third riser conduit;

the inner diameter of the third riser conduit being spaced from the outer diameter of the second riser conduit;

a top annular seal at the top end of the third riser conduit and a bottom annular seal at the bottom end of the third discharge section; and the top and bottom annular seals, the third riser conduit, the third discharge section and the second riser conduit cooperating to establish a preferential fluid flow path through the third riser conduit to the third discharge section.

19. A process for introducing a fluid into a contaminated subsurface area of the ground having different levels, the process comprising the steps of:
establishing a fluid injection well, wherein the fluid injection well includes a well bore hole having a side and a bottom, the fluid injection well further including a first fluid transfer device and a second fluid transfer device, the first fluid transfer device having a first discharge section and a first riser pipe in the well bore hole, the first discharge section being at a first level, the first riser conduit extending up from the first discharge section toward the ground surface, the first discharge section having an outlet for the flow of fluid therefrom, the second fluid transfer device having a second discharge section and a second riser conduit, the second discharge section being positioned within the same well bore hole at a second level between the first level and the ground surface, the second riser conduit extending up from the second discharge section toward the ground surface, the second discharge section having an outlet for the flow of fluid therefrom, and introducing fluid into the first riser conduit and into the second riser conduit so that the fluid flows down the first riser to the first discharge section and through the first discharge section outlet to the well bore hole and through the side wall of the well bore hole into the first level of ground, and so that the fluid flows down the second riser to the second discharge section and through the second discharge section outlet to the well bore hole and through the side wall of the well bore hole into the second level of ground;

wherein said entire well bore hole is isolated from any extraction apparatus while said fluid is introduced into the first and second riser conduits.

20. The process of claim 19 wherein the step of establishing a fluid injection well includes sealing the borehole between the first and second discharge sections and above the second discharge section.

21. The process of claim 19 further comprising the steps of:
establishing an extraction well spaced from the first well prior to the step of introducing fluid into the first and second riser conduits, the extraction well including an extraction well bore hole and having a bottom and a side wall, the extraction well further including an extraction conduit in the extraction well bore hole and having an inlet for fluid to flow from the bore hole and into the extraction conduit; and applying a withdrawing force to the extraction conduit to draw fluid into the extraction well bore hole and into the inlet of the extraction conduit.

22. The process of claim 19 wherein the contaminated subsurface area of ground includes a third level and wherein the fluid injection well includes a third fluid transfer device having a third discharge section and a third riser pipe, the third discharge section being positioned in the same well bore hole at a third level between the second level and the ground surface, the third riser conduit extending up from the third discharge section toward the ground surface, the third discharge section having an outlet for the flow of fluid therefrom, the third level being above the second seal, the process further comprising the step of:
introducing fluid into the third riser conduit after the step of establishing said fluid injection well so that fluid flows down the third riser conduit to the third discharge section and through the third discharge section outlet to the well bore hole and through the side wall of the well bore hole into the third level of contaminated subsurface ground.

23. The process of claim 19 wherein the step of introducing fluid comprises introducing different fluids into the first and second riser conduits.

* * * * *